United States Patent
Wang et al.

(10) Patent No.: US 8,554,839 B2
(45) Date of Patent: Oct. 8, 2013

(54) METHOD AND DEVICE FOR INTERCOMMUNICATING ADDRESS BOOK INFORMATION BETWEEN DIFFERENT NETWORKS

(75) Inventors: Lei Wang, Shenzhen (CN); Shunan Fan, Shenzhen (CN); Ting Dong, Shenzhen (CN); Jian Yang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 267 days.

(21) Appl. No.: 13/110,525

(22) Filed: May 18, 2011

(65) Prior Publication Data

US 2011/0219074 A1 Sep. 8, 2011

Related U.S. Application Data

(63) Continuation of application No. PCT/CN2009/073992, filed on Sep. 17, 2009.

(30) Foreign Application Priority Data

Nov. 19, 2008 (CN) .......................... 2008 1 0177043

(51) Int. Cl.
*G06F 15/16* (2006.01)
(52) U.S. Cl.
USPC ....................................................... 709/204
(58) Field of Classification Search
USPC ....................................................... 709/204
See application file for complete search history.

(56) References Cited

U.S. PATENT DOCUMENTS

| 5,119,437 A | 6/1992 | Kuwamura et al. |
| 6,748,402 B1 | 6/2004 | Reeves et al. |
| 2006/0256813 A1 | 11/2006 | Brusca et al. |
| 2010/0077027 A1* | 3/2010 | Chitturi et al. ............... 709/203 |
| 2011/0131219 A1* | 6/2011 | Martin-Cocher et al. .... 707/754 |

FOREIGN PATENT DOCUMENTS

| CN | 1589046 A | 3/2005 |
| CN | 101291274 A | 10/2008 |
| CN | 101431537 A | 5/2009 |
| JP | 3-161891 | 7/1991 |
| WO | WO 2001/44911 A2 | 6/2001 |
| WO | WO 2009/76295 A2 | 6/2009 |

OTHER PUBLICATIONS

International Search Report issued in corresponding PCT Patent Application No. PCT/CN2009/073992, mailed Dec. 24, 2009.
Office Action issued in Chinese Patent Application No. 200810177043.1, mailed Oct. 29, 2010.

(Continued)

*Primary Examiner* — Larry Donaghue
(74) *Attorney, Agent, or Firm* — Brinks Hofer Gilson & Lione (57) ABSTRACT

A method for intercommunicating address book information between different networks is provided, which includes the following steps: an interworking request carrying address book information is received, in which the interworking request comes from a network address book system other than a Converged Address Book (CAB) system; the address book information is converted according to an address book format supported by a server of the CAB system; the converted address book information is sent to the CAB system. A device and a system for implementing the method are further provided.

11 Claims, 7 Drawing Sheets

(56) References Cited

OTHER PUBLICATIONS

Open Mobile Alliance, "Converged Address Book Architecture", Draft Version 1.0. OMA-AD-CAB-V1_0-20081027-D, Oct. 27, 2008. pp. 1-18.
Open Mobile Alliance, "Converged Address Book Architecture", Draft Version 1.0. OMA-AD-CAB-V1_0-20081027-D, Oct. 27, 2008. pp. 1-16.
Open Mobile Alliance, "Converged Address Book Architecture", Candidate Version 1.0. OMA-RD-CAB-V1_0-20080826-C, Aug. 26, 2008. pp. 1-23.

Extended European Search Report issued in corresponding European Patent Application No. 09827145.5, mailed Feb. 14, 2012.
Written Opinion of the International Searching Authority issued in corresponding PCT Patent Application No. PCT/CN2009/073992, mailed Dec. 24, 2009.
Open Mobile Alliance, "Converged Address Book" Work Item Document. OMA-WID_0155- CAB-V1_0-20071009-A, 2007. XP-008144417.
Open Mobile Alliance, "Converged Address Book Requirements" Candidate Version 1.0, Dec. 17, 2008. XP-002604550.

* cited by examiner

METHOD AND DEVICE FOR INTERCOMMUNICATING ADDRESS BOOK INFORMATION BETWEEN DIFFERENT NETWORKS

CROSS-REFERENCE TO RELATED APPLICATIONS

This application is a continuation of International Application No. PCT/CN2009/073992, filed on Sep. 17, 2009, which claims priority to Chinese Patent Application No. 200810177043.1, filed on Nov. 19, 2008, both of which are hereby incorporated by reference in their entireties.

FIELD OF THE INVENTION

The present invention relates to the field of network technologies, and in particular, to a method and a device for intercommunicating address book information between different networks.

BACKGROUND OF THE INVENTION

The current society is an information society, and a user can exchange information with other users through a mobile device at any moment, or control execution of application programs in the mobile device. In some cases, a result of the information exchange or the application program execution needs to be stored in the mobile device, and kept in agreement with the same type of information in other devices. For example, an address book is stored in a mobile phone and a Personal Digital Assistant (PDA), and the same address book is also stored in a Personal Computer (PC) or a notebook computer in the office and at the home, and the user expects that address book information in these devices can be kept in agreement with each other, that is, when address book information in one of the devices is changed, address book information in other devices can also be correspondingly updated.

The address book is a basic function of various services, a user generally has multiple address books, for example, an address book stored in a telephone set, an address book in a Subscriber Identity Module (SIM) card, a service based address book, and an address book provided by an Internet Service Provider (ISP), and the user needs to process the multiple address books. For facilitating the processing by the user, a uniform address book standard is needed, and many standards exist in the prior art, which are briefly introduced below.

1. Converged Address Book (CAB)

The CAB enables users to backup their address books to a network, and retrieve the address books from the network, amend address book content, and exchange with other contacts, or update personal information. In addition, the CAB supports multi-terminal access, and can be multiplexed by multiple different service engines, and span multiple different networks.

2. vCard

The vCard is a format of a contact widely used in Internet, which enables automation of exchange of personal and service information (for example, telephone number and address) through the network, and the included information can be, for example, a picture, an organization logo, and a Web address. The vCard is referred to as an electronic commerce card, which is mainly used to record contact information on an address book, and is convenient for data exchange between different devices. The vCard format is briefly introduced below, which includes the following components.

vCard Object: a vCard data stream may include one or more vCard Objects, and one vCard Object in the data stream is labeled as data beginning with "BEGIN:VCARD", and ended with "END:VCARD", and if the data stream does not include the "END:VCARD", it is indicated that the vCard Object includes all data from the "BEGIN:VCARD" to the end of the data stream.

vCard Property: vCard is a set of one or more Properties, one Property is a uniquely designated value, and a series of Properties may form a group in the vCard.

A format of the vCard Property is as follows:

PropertyName[';' PropertyParameters]':' PropertyValue, in which:

① PropertyName and PropertyParameters are case insensitive.

② PropertyParameters is optional, may be zero or more, and are separated from the PoperyName with a semicolon, and separated from the Property Value with a colon.

③ vCard may be presented in multiple rows. See vCard Specification for reference.

For example, in TEL;HOME:+86111222333, the PropertyName is TEL, the PropertyParameters is HOME, and the PropertyValue is +86111222333.

④ Encoding: a default encoding manner of the vCard is 7-Bit. The default encoding manner may be changed by using an ENCODING Property parameter. A value thereof may be BASE64; QUOTED-PRINTABLE; or 8BIT.

The parameter may be used in any Property.

The QUOTED-PRINTABLE encoding manner is briefly described below, and relevant documents may be referred to for more details: ASCII displayable characters are substantially kept unchanged. Unicode characters or UTF8 encoding characters are represented with equal signs plus corresponding hexadecimal codes. For example, CHARSET is that UTF8 codes 0xE5, 0xAE, and 0xB6 corresponding to UTF8 character=E5=AE=B6=E4=BA=BA represent a Chinese character "home", and the others represent a Chinese character "person". In addition, if any, the displayable ASCII code is output intact.

⑤ Character Set: a default character set is ASCII, which can be changed with a CHARSET parameter. A value of the parameter may be all character sets registered by the Internet Assigned Numbers Authority (IANA). The parameter can be used for any Property, but some of them do not function.

3. hCard is an open format for presenting personal address book information, which can be mapped with a standard vCard (RFC2426) protocol at 1:1, and the vCard format is based on a structure of the hCard. Relevant documents may be referred to for the specific structure.

The vCard or hCard format is a format supported by a conventional network phone book, such as Personal Information Manager (PIM), and the CAB network phone book system uses the CAB phone book format. The prior art has no technical solution for intercommunicating phone books between a CAB network and a third party network (for example, a PIM network). When a user of a conventional network phone book activates a CAB network phone book service, an address book previously stored in the conventional network phone book system cannot complete the inheritance of the corresponding account to the CAB network phone book system at the system side, thereby causing inconvenience to the user.

SUMMARY OF THE INVENTION

In view of this, in an aspect, the present invention is directed to a method and a device for intercommunicating address book information between different networks, so as to achieve interworking of address books between different networks.

In an aspect, the present invention is directed to a communication system, so as to achieve interworking of address books between different networks.

The present invention provides a method for intercommunicating address book information between different networks, where the method includes:

receiving an interworking request carrying address book information, in which the interworking request comes from a network address book system other than a CAB system;

converting the address book information according to an address book format supported by a server of the CAB system; and sending the converted address book information to the CAB system.

The present invention further provides another method for intercommunicating address book information between different networks, where the method includes:

receiving an interworking request from a CAB system, in which the interworking request carries address book information and an identifier of a target network address book system;

converting the address book information according to an address book format supported by the target network address book system; and sending the converted address book information to the target network address book system.

The present invention further provides a device for intercommunicating address book information between different networks, where the device includes a first forwarding control unit, a first format conversion unit, and a first sending unit, in which:

the first forwarding control unit is configured to receive an interworking request from a CAB system, in which the interworking request carries address book information and an identifier of a target network address book system; and provide the address book information and the identifier of the target network address book system to the first format conversion unit;

the first format conversion unit is configured to determine an address book format according to the identifier of the target network address book system, and convert the address book information into the corresponding address book format; and the first sending unit is configured to send the converted address book information to the target network address book system.

The present invention further provides a device for intercommunicating address book information between different networks, where the device includes a second forwarding control unit, a second sending unit, and multiple second format conversion units, in which:

the second forwarding control unit is configured to receive an interworking request from a CAB system, in which the interworking request carries address book information and an identifier of a target network address book system; and provide the address book information to a corresponding second format conversion unit according to a predetermined corresponding relation between a network address book system and the second format conversion units;

the second format conversion unit is configured to convert the address book information into address book information in an address book format supported by the target network address book system; and the second sending unit is configured to send the converted address book information to the target network address book system.

The present invention further provides another device for intercommunicating address book information between different networks, which includes a third forwarding control unit, a third format conversion unit, and a third sending unit, in which:

the third forwarding control unit is configured to receive an interworking request carrying address book information, in which the interworking request comes from a network address book system other than a CAB system;

the third format conversion unit is configured to convert the address book information according to an address book format supported by the CAB system; and the third sending unit is configured to send the converted address book information to the CAB network address book system.

The present invention further provides a communication system, where the communication system includes a CAB system, a third party network address book system, and a Network Equipment (NE), in which:

the NE is configured to receive an interworking request from the CAB system, in which the interworking request carries address book information and an identifier of the third party network address book system; convert the address book information according to an address book format supported by the third party network address book system; and send the converted address book information to the third party network address book system.

The present invention further provides another communication system, where the communication system includes a CAB system, a third party network address book system, and an NE, in which:

the NE is configured to receive an interworking request from the third party network address book system, convert address book information according to an address book format supported by the CAB system, and send the converted address book information to the CAB system.

It can be seen from the technical solutions that compared with the prior art, the present invention provides technical solutions for intercommunicating address books between a CAB network address book system and a conventional network address book system, by which address book information of the conventional network address book system can be very conveniently imported in the CAB network address book system through format conversion, and the technical solutions can be conveniently employed by a user as the user is not required to participate in such a process.

BRIEF DESCRIPTION OF THE DRAWINGS

To make the technical solution under the present invention clearer, the accompanying drawings for illustrating the embodiments of the present invention or the prior art are outlined below. Apparently, the accompanying drawings are for the exemplary purpose only, and person having ordinary skill in the art can derive other drawings from such accompanying drawings without any creative effort.

DETAILED DESCRIPTION OF THE EMBODIMENTS

The present invention provides a technical solution, so as to interwork address book information between different networks, especially between a CAB network phone book system and a conventional network phone book system. That is to say, address book information of a user can be conveniently imported/exported between the CAB network address book system (also referred to as a CAB system) and the conventional network phone book system.

The following detailed description is directed to the technical solution of the present invention with reference to the accompanying drawings. However, the embodiments to be described are only part of, rather than all of, the embodiments of the present invention. Persons having ordinary skill in the art can derive other embodiments from the embodiments given herein without making any creative effort, and all such embodiments are covered in the scope of the present invention.

Figure 1:
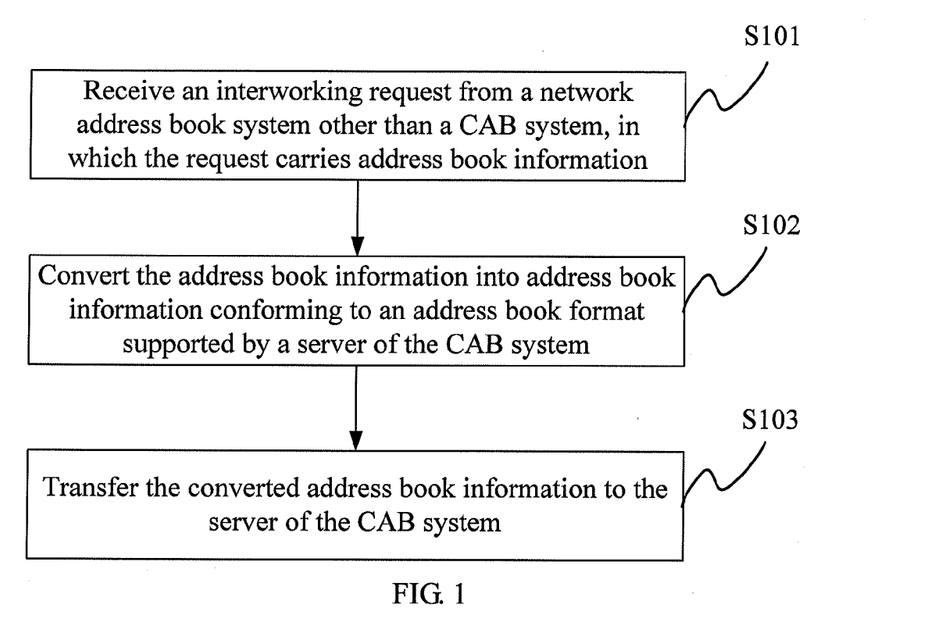
FIG. 1 is a schematic view of a method for intercommunicating address book information between different networks according to an embodiment of the present invention.

Referring to FIG. 1, a method for intercommunicating address book information between different networks according to an embodiment of the present invention is provided, which is used to import address book information in a conventional network address book system into a CAB network address book system, and includes the following steps.

In Step S101, an interworking request is received from a network address book system other than the CAB network address book system, in which the request carries address book information.

In Step S102, the address book information is converted into address book information conforming to an address book format supported by a server of the CAB network address book system.

In Step S103, the converted address book information is transferred to the server of the CAB network address book system.

The network address book system other than the CAB network address book system may be one of conventional network address book systems, and the address book information thereof may be in a vCard format or in an hCard format.

The address book format supported by the server of the CAB network address book system includes several types, and a common format is as follows:

```
Beginning row=PCI (Personal Communication Information)
SP Version Number
*<Name (description): character>
*<TeL (description): digital figure>
*<Email (description): RFC822 Internet address>
*<Address (description): Street SP, City SP, Country SP, Post Code>
End row
```

Hereinafter, a process of Step S102 is described by taking an example that the address book information of the network address book system other than the CAB network address book system is in the vCard format and the address book format supported by the server of the CAB network address book system is the common format.

First, information of key fields in the vCard is read.

The key fields may include, for example, Name (N), Family name (FN), Organization (ORG), Mobile Phone, Work Telephone Number, Fax Number, Address, and Email.

Then, the information of the key fields is written into corresponding fields of a CAB in the common format. For example, information of Field N is written into Field Name of the PCI, and information of Field Email is written into Field Email of the PCI.

Finally, complete address book information is generated according to specifications of the PCI format.

After all the key fields in the vCard are written into corresponding fields of the PCI, a beginning row and an end row are generated according to the format requirements of the PCI, so as to obtain complete address book information in the PCI format.

Additional description is made with an example below, in which it is assumed that personal information in the vCard format is as follows:

```
BEGIN: VCARD
VERSION: 2.1
N: Li Ming
FN: Li
ORG: Huawei Technologies Co., Ltd.
TEL;WORK;VOICE:139********
TEL;WORK;VOICE:0108283****
TEL;WORK;FAX:0108254****
```

```
ADR;WORK:;;;;Beijing;;;China
LABEL;WORK;ENCODING=QUOTED-PRINTABLE:
=B1=B1=BE=A9
EMAIL;PREF;INTERNET:li.ming@huawei.com
REV:20080626T170408Z
END:VCARD
```

After conversion according to the steps, the following complete address book information in the PCI format is obtained:
PCI 1.0
Name (Chinese Character): Li Ming
Family Name: Li
Work Address: Beijing, China
TeL (Office): 8283****
TeL (Mobile Phone): 139********
TeL (Fax): 8254****
Email: li.ming@huawei.com According to the same principle, address book information in the hCard format or address book information in other formats is converted into address book information in the PCI format, and the description is not made in detail here again.

Figure 2:
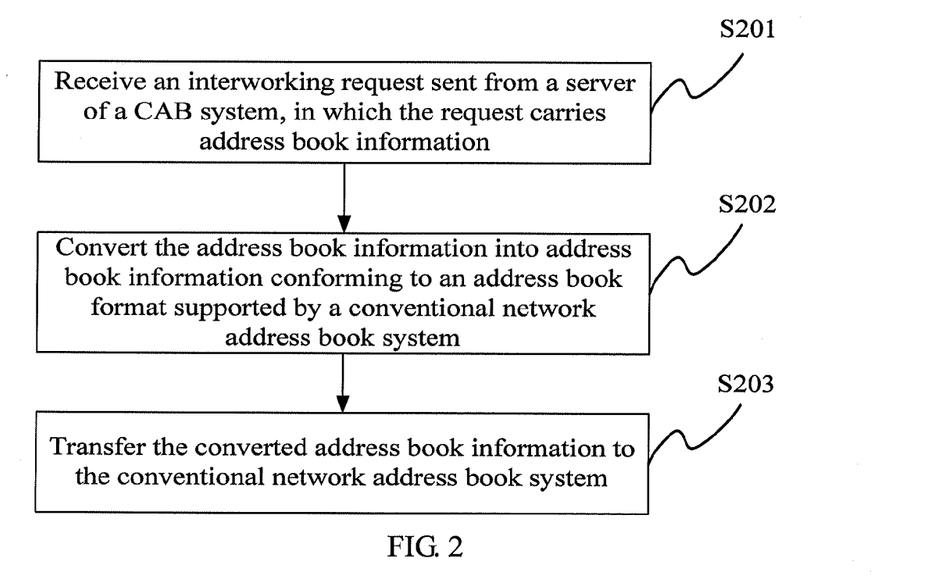
FIG. 2 is a schematic view of another method for intercommunicating address book information between different networks according to an embodiment of the present invention.

Referring to FIG. 2, a method for intercommunicating address book information between different networks according to an embodiment of the present invention is provided, which is used to import address book information in a CAB network address book system into a conventional network address book system, and includes the following steps.

In Step S201, an interworking request sent from a server of the CAB network address book system is received, in which the request carries address book information.

In Step S202, the address book information is converted into address book information conforming to an address book format supported by the conventional network address book system.

In Step S203, the converted address book information is transferred to the conventional network address book system.

The address book format of the conventional network address book system may be a vCard format or an hCard format, and the principle for converting the address book information of the CAB network address book system into the vCard format is the same as that for converting the address book information in the vCard format into the address book information conforming to the address book format (for example, PCI) of the CAB network address book system.

A specific process may be as follows. First, information of key fields in the PCI is read, in which the key fields may include, for example, Name, Organization, Mobile Phone, Work Telephone Number, Fax Number, Address, and Email. Then, the information of the key fields is written into corresponding fields of the vCard. For example, information of Field Name is written into Field N of the vCard. Finally, complete address book information is generated according to specifications of the vCard format. After all the key fields in the PCI are written into the corresponding fields of the vCard, a beginning row and an end row are generated according to format requirements of the vCard, so as to obtain the complete address book information in the vCard format.

According to the same principle, the address book information in the PCI format may be converted into address book information in the hCard format or address book information in other formats, and the description is not made in detail here again.

In addition, in order to correspondingly protect address book information of a user, an access control mechanism may be employed in the communication process, in which accounts in different network address book systems are bound, for example, an account of a user in a conventional network address book is bound with a corresponding account of the user in a CAB network address book, such that personal information of the user is restricted to be intercommunicated only between corresponding accounts.

Figure 3:
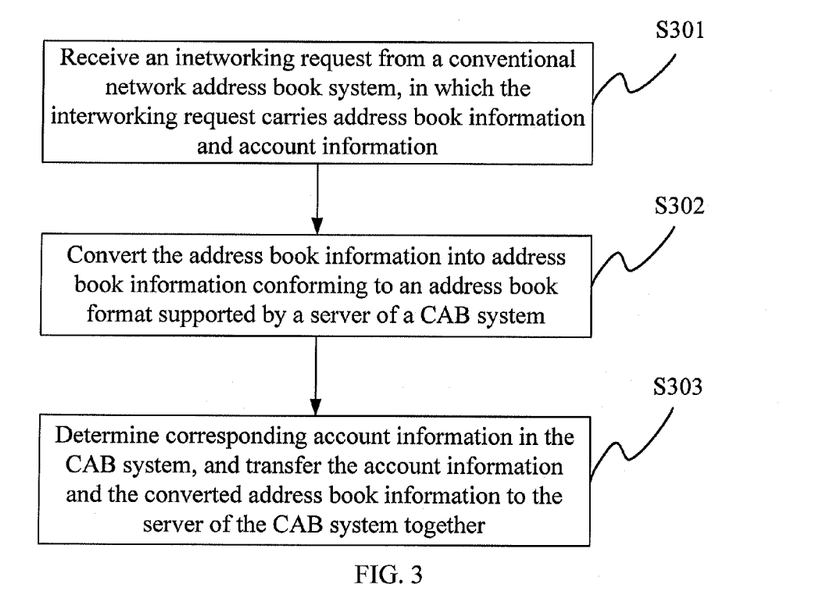
FIG. 3 is a schematic view of another method for intercommunicating address book information between different networks according to an embodiment of the present invention.

Hereinafter, description is made with importing of address book information in a conventional network address book system into a CAB network address book system as an example. FIG. 3 is a flow chart of a method for intercommunicating address book information between different networks, and the method includes the following steps.

In Step S301, an interworking request is received from the conventional network address book system, in which the interworking request carries address book information and account information.

In Step S302, the address book information is converted into address book information conforming to an address book format supported by a server of the CAB network address book system.

In Step S303, corresponding account information in the CAB network address book system is determined, and the account information and the converted address book information are transferred to the server of the CAB network address book system together.

After the server of the CAB network address book system receives the account information and the converted address book information, if the account is a new account, or the address book information corresponding to the account is empty, the address book information is directly stored to be corresponding to the account; or otherwise, the address book information is used to update original address book information corresponding to the account.

Likewise, the address book information in the CAB network address book system may be imported into the conventional network address book system according to the same principle, and the description is not made in detail here again.

Figure 4:
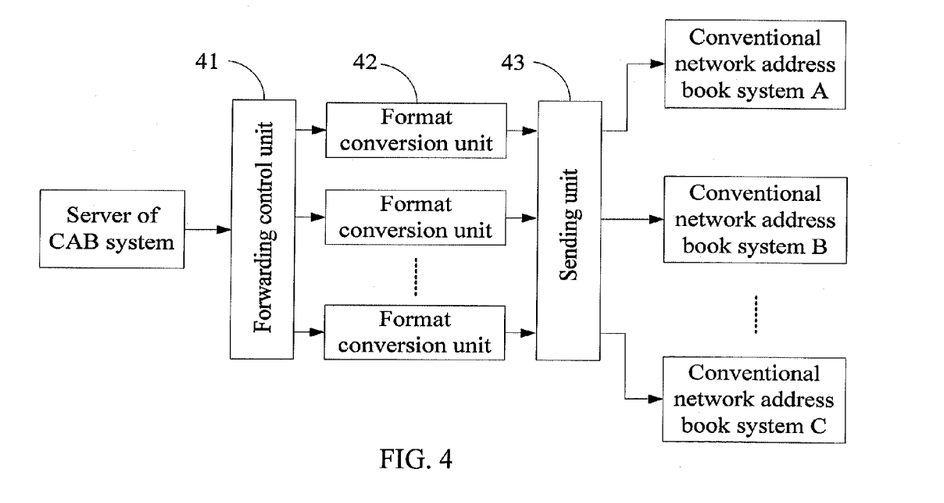
FIG. 4 is a schematic structural view of a device for intercommunicating address book information between different networks according to an embodiment of the present invention.

With respect to the method embodiments, the present invention further provides a device for implementing part of the method embodiments. As shown in FIG. 4, the device includes a forwarding control unit 41, format conversion units 42, and a sending unit 43, in which different format conversion units 42 are corresponding to different conventional network address book systems, and are configured to convert address book information (in a PCI format) of a CAB network address book system into address book information in a corresponding format (for example, a vCard format or an hCard format).

The forwarding control unit 41 receives an interworking request from a CAB server (in which the interworking request carries address book information and an identifier of a target network address book system), and provides the address book information to a format conversion unit 42 corresponding to the target network address book system according to the identifier. The address book information is converted by the format conversion unit 42 and then sent to the target network address book system by the sending unit 43.

An address book format supported by the target network address book system may be a vCard format, and in this case, a corresponding work process of the format conversion unit 42 may be as follows.

First, information of key fields in the PCI is read, in which the key fields may include Name, Organization, Mobile Phone, Work Telephone Number, Fax Number, Address, and Email. Then, the information of the key fields is written into corresponding fields of the vCard, for example, information of Field Name is written into Field N of the vCard. Finally, complete address book information is generated according to specifications of the vCard format. After all the key fields in the PCI are written into corresponding fields in the vCard, a beginning row and an end row are generated according to format requirements of the vCard, so as to obtain the complete address book information in the vCard format, which is provided to the sending unit 43.

The address book format supported by the target network address book system may also be an hCard format, and in this case, a work process of the format conversion unit 42 is similar to the foregoing one, and the description is not made in detail here again.

Figure 5:
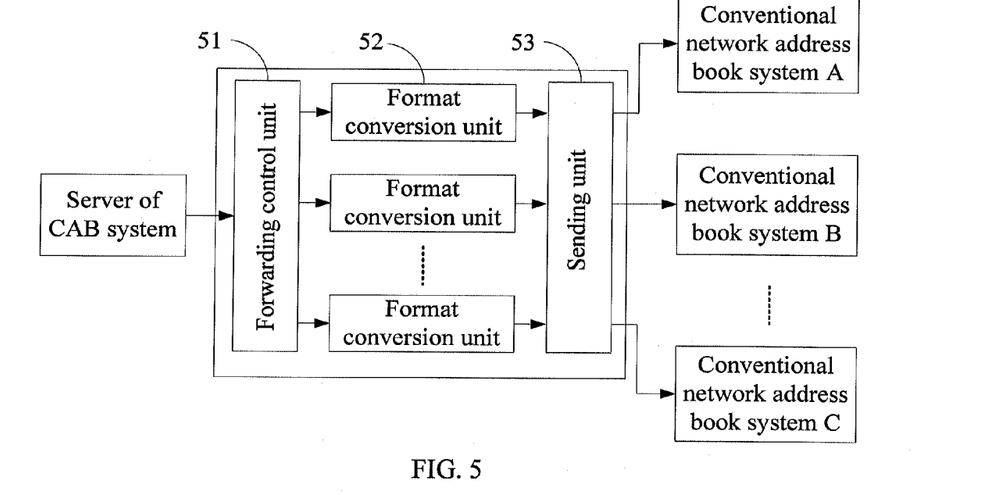
FIG. 5 is a schematic structural view of another device for intercommunicating address book information between different networks according to an embodiment of the present invention.

A device according to another embodiment may include a forwarding control unit 51, format conversion units 52, and a sending unit 53, in which the forwarding control unit 51 and the sending unit 53 are similar to the forwarding control unit 41 and the sending unit 43. Unlike the foregoing embodiment, in this embodiment, multiple format conversion units 52 are integrated with the forwarding control unit 51 into one unit having an interworking function, as shown in FIG. 5.

Figure 6:
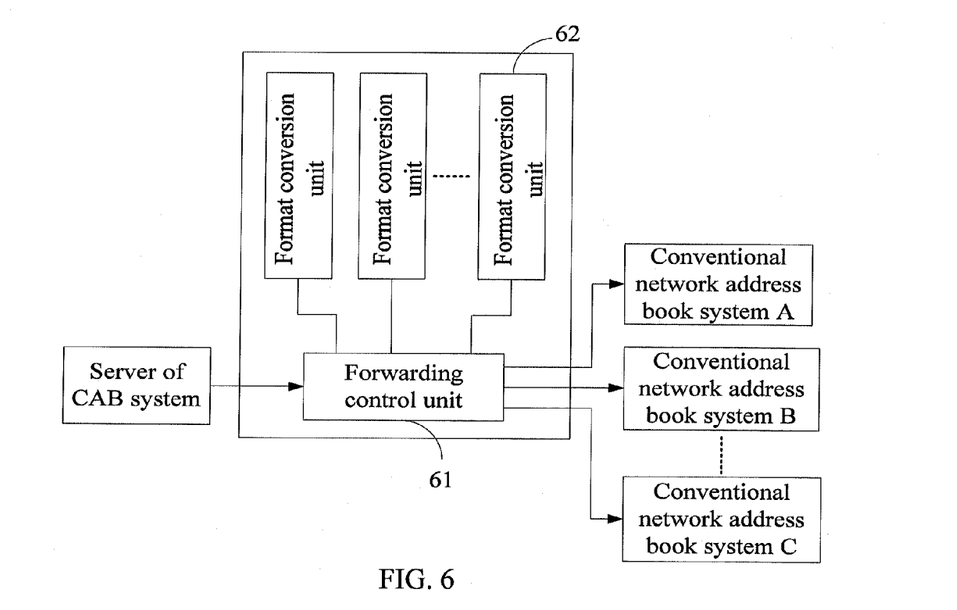
FIG. 6 is a schematic structural view of another device for intercommunicating address book information between different networks according to an embodiment of the present invention.

A device according to an additional embodiment may include a forwarding control unit 61, and several format conversion units 62, in which the format conversion units 62 are similar to the format conversion units 52, and the forwarding control unit 61 integrates the functions of the sending unit 53 and the forwarding control unit 51. As shown in FIG. 6, the forwarding control unit 61 receives an interworking request from a CAB server (in which the interworking request carries address book information and an identifier of a target network address book system), provides the address book information to a format conversion unit 62 corresponding to the target network address book system according to the identifier, and sends a conversion result obtained after the address book information is converted by the format conversion unit 62 to the target network address book system.

Figure 7:
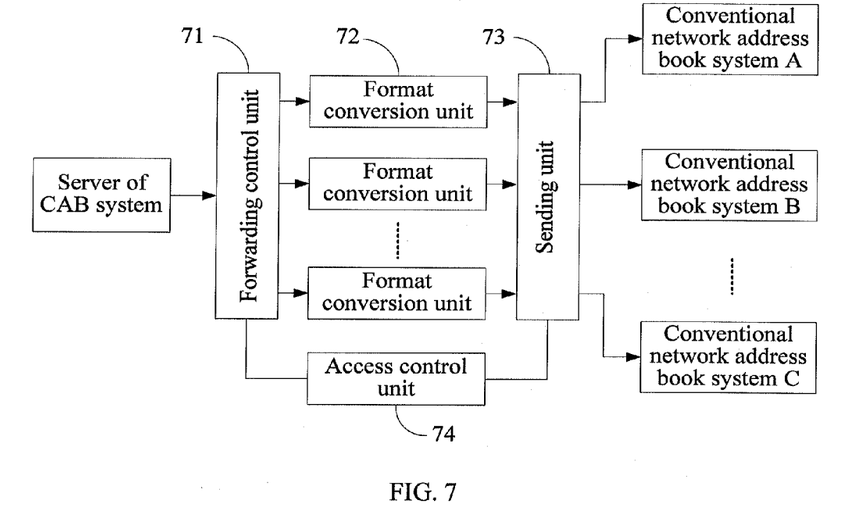
FIG. 7 is a schematic structural view of another device for intercommunicating address book information between different networks according to an embodiment of the present invention.

In addition, in order to correspondingly protect address book information of a user, a function unit configured to perform access control may be added on the basis of the foregoing embodiment. As shown in FIG. 7, a device includes a forwarding control unit 71, format conversion units 72, a sending unit 73, and an access control unit 74, in which the forwarding control unit 71, the format conversion units 72, and the sending unit 73 have functions similar to those of the forwarding control unit 41, the format conversion units 42, and the sending unit 43 as shown in FIG. 4; the access control unit 74 is configured to acquire an interworking request received by the forwarding control unit 71, in which the interworking request carries address book information, an identifier of a target network address book system, and user account information (which is an account of the user in a CAB network address book system, and is referred to as account information A herein for ease of description), determine account information of the user in the target network address book system (which is referred to as account information B herein for ease of description) according to a predetermined account binding relation, and provide the account information B to the sending unit 73; the sending unit 73 sends the account information B and the converted address book information to the target network address book system together.

The access control unit 74 may further directly instruct the target network address book system to perform identity authentication on the corresponding account information after determining the account information of the user in the target network address book system, and directly acquire relevant authentication data corresponding to an account sent from the target network address book system. If the authentication is successful, the sending unit 73 sends the converted address book information to the target network address book system; or otherwise, sends information for indicating that the authentication fails to the target network address book system.

Figure 8:
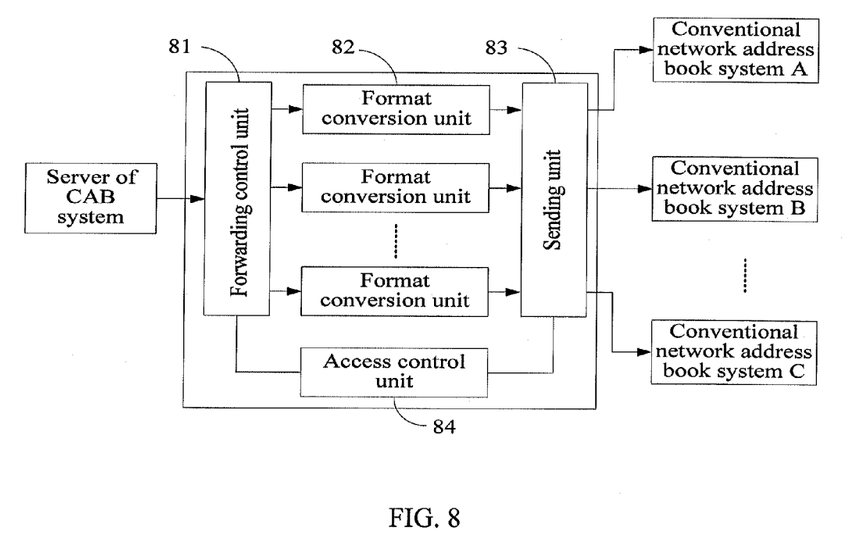
FIG. 8 is a schematic structural view of another device for intercommunicating address book information between different networks according to an embodiment of the present invention.

A device according to another embodiment includes a forwarding control unit 81, format conversion units 82, a sending unit 83, and an access control unit 84. As shown in FIG. 8, the functions of the units are similar to those of the forwarding control unit 71, the format conversion units 72, the sending unit 73, and the access control unit 74 as shown in FIG. 7, except that the access control unit 84 is integrated with the forwarding control unit 81, the format conversion units 82, and the sending unit 83 into one function unit. After determining account information of a user in a target network address book system, the sending unit 83 sends notification information, for instructing the target network address book system to perform identity authentication on a corresponding account, acquires, from the forwarding control unit 81, relevant authentication data of the corresponding account sent from the target network address book system, authenticates the user, sends the converted address book information to the target network address book system if the authentication is successful, or otherwise, sends information for indicating that the authentication fails.

In the embodiment of the present invention, an access control mechanism may be employed, in which accounts in different network address book systems are bound, for example, an account of a user in a conventional network address book is bound with a corresponding account of the user in a CAB network address book, such that personal information of the user is restricted to be intercommunicated only between corresponding accounts. In addition, the account information of the user may be authenticated, so as to further ensure the security of user information.

Figure 9:
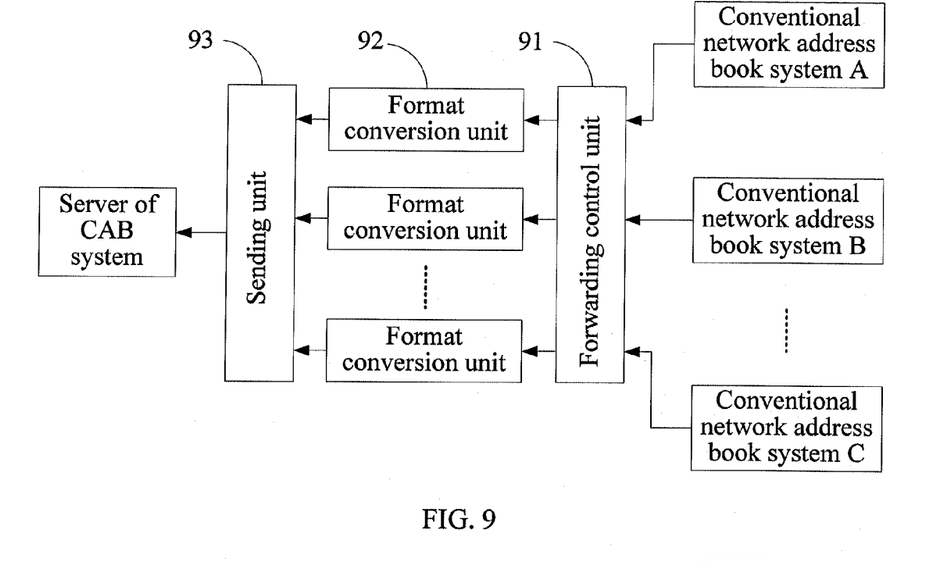
FIG. 9 is a schematic structural view of another device for intercommunicating address book information between different networks according to an embodiment of the present invention.

The device according to the foregoing embodiment is mainly configured to convert a CAB network address book into address book information conforming to an address book format supported by a conventional network address book system. In another embodiment, the present invention further provides another device, configured to convert address book information of a conventional network address book system into address book information conforming to an address book format supported by a CAB network address book system. As shown in FIG. 9, the device includes a forwarding control unit 91, format conversion units 92, and a sending unit 93.

The forwarding control unit 91 receives an interworking request from a conventional network address book system, in which the interworking request carries address book information in a predetermined format (for example, address book information in a vCard format), and provides the address book information to a format conversion unit 92 corresponding to the conventional network address book system sending the interworking request according to a predetermined corresponding relation between the format conversion units 92 and conventional network address book systems (different format conversion units 92 are corresponding to different conventional network address book systems). After receiving the address book information, the format conversion unit 92 converts the address book information into address book information conforming to an address book format supported by a CAB network address book system according to a predetermined process, and then the converted address book information is sent by the sending unit 93 to a server of the CAB network address book system.

When the predetermine format is the vCard format, a work process of the format conversion unit 92 may be as follows.

First, information of key fields in the vCard is read, in which the key fields may include N, FN, ORG, Mobile Phone, Work Telephone Number, Fax Number, Address, and Email.

Then, the information of the key fields is written into corresponding fields of a CAB in the common format. For example, information of Field N is written into Field Name of the PCI, and information of Field Email is written into Field Email of the PCI.

Finally, complete address book information is generated according to specifications of the PCI format. After all the key fields in the vCard are written into corresponding fields of the PCI, a beginning row and an end row are generated according to the format requirements of the PCI, so as to obtain complete address book information in the PCI format.

Figure 10:
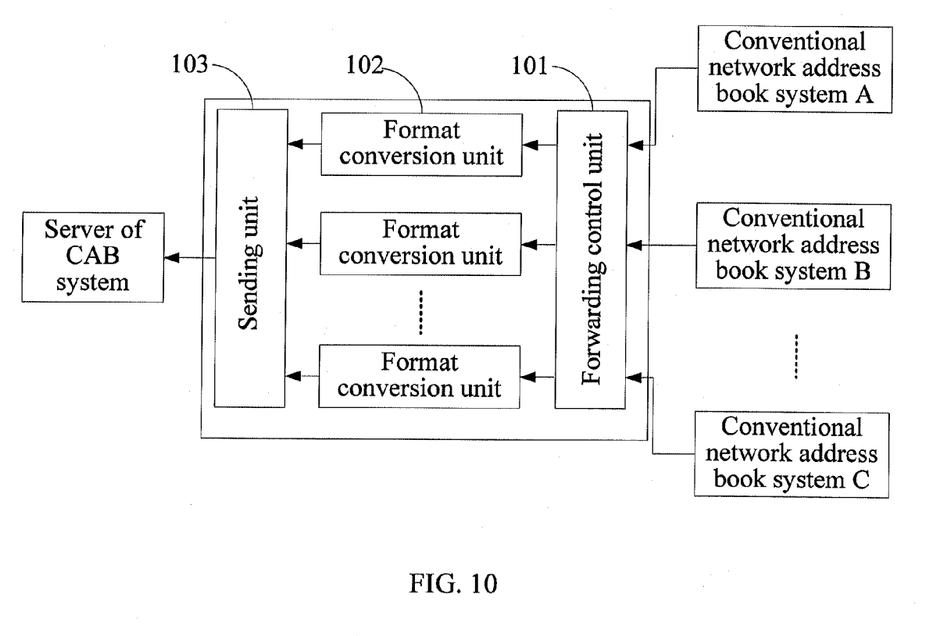
FIG. 10 is a schematic structural view of another device for intercommunicating address book information between different networks according to an embodiment of the present invention.

A device according to another embodiment may include a forwarding control unit 101, format conversion units 102, and a sending unit 103. The forwarding control unit 101 and the sending unit 103 are similar to the forwarding control unit 91 and the sending unit 93, and this embodiment differs from the foregoing embodiment in that multiple format conversion units 102, the forwarding control unit 101, and the sending unit 103 are integrated into a unit having the interworking function, as shown in FIG. 10.

Figure 11:
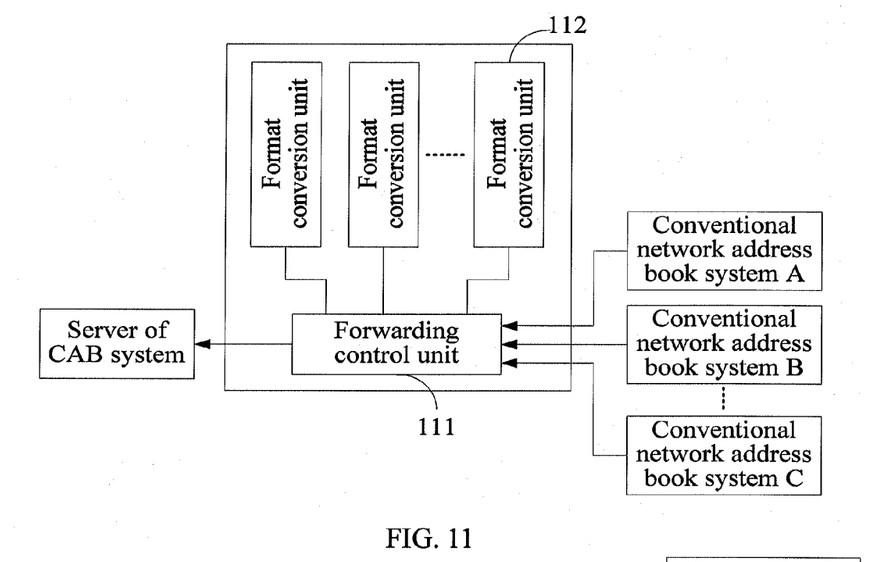
FIG. 11 is a schematic structural view of another device for intercommunicating address book information between different networks according to an embodiment of the present invention.

A device according to an additional embodiment may include a forwarding control unit 111 and several format conversion units 112. The format conversion units 112 are similar to the format conversion units 102, and the forwarding control unit 111 integrates the functions of the sending unit 102 and the forwarding control unit 101, as shown in FIG. 11. The forwarding control unit 111 receives an interworking request from a conventional network address book system, in which the interworking request carries address book information in a predetermined format (for example, address book information in a vCard format), provides the address book information to a format conversion unit 112 corresponding to the conventional network address book system sending the interworking request according to a predetermined corresponding relation between the format conversion units 112 and conventional network address book systems (different format conversion units 112 are corresponding to different conventional network address book systems), and sends a conversion result obtained after the address book information is converted by the format conversion unit 112 to a server of a CAB network address book system.

Figure 12:
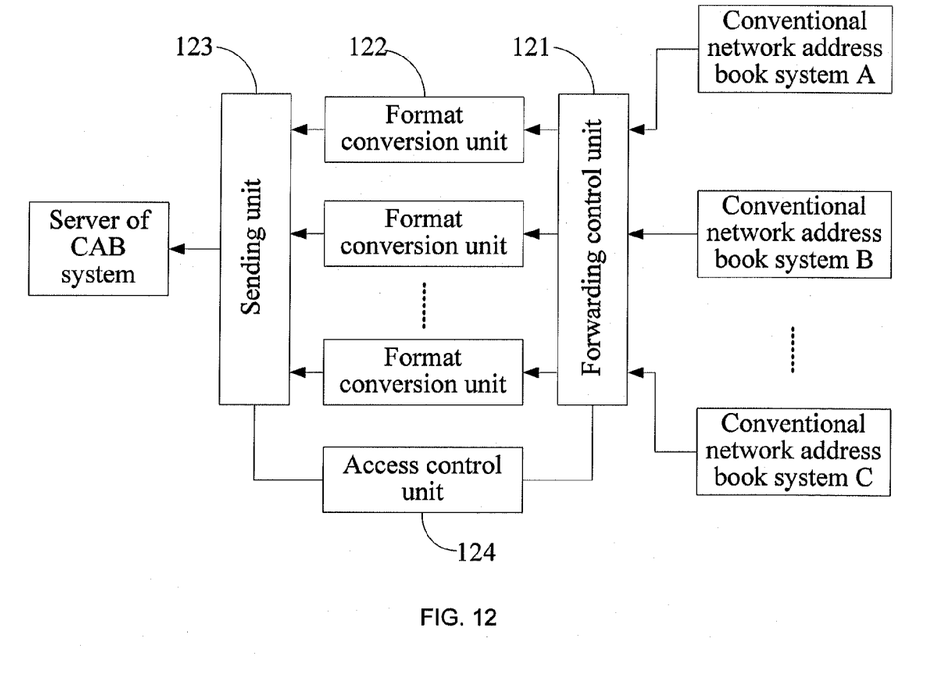
FIG. 12 is a schematic structural view of another device for intercommunicating address book information between different networks according to an embodiment of the present invention.

In addition, in order to correspondingly protect address book information of a user, a function unit configured to perform access control may be added on the basis of the foregoing embodiment. As shown in FIG. 12, a device includes a forwarding control unit 121, format conversion units 122, a sending unit 123, and an access control unit 124, in which the forwarding control unit 121, the format conversion units 122, and the sending unit 123 have functions similar to those of the forwarding control unit 101, the format conversion units 102, and the sending unit 103 as shown in FIG. 10; the access control unit 124 is configured to acquire an interworking request received by the forwarding control unit 121 from a conventional network address book system, in which the interworking request carries address book information, a system identifier, and user account information (the user account is an account of the user in the conventional network address book system, and is referred to as an account A for ease of description), determine account information of the user in a CAB network address book system (which is referred to as account information B herein for ease of description) according to a predetermined account binding relation, and provide the account information B to the sending unit 123; the sending unit 123 sends the account information B and the converted address book information to a server of the CAB network address book system together.

Figure 13:
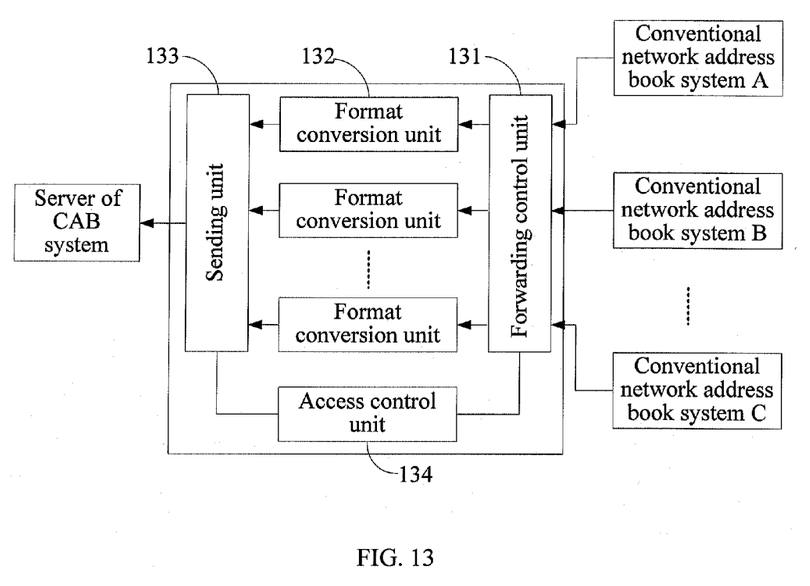
FIG. 13 is a schematic structural view of another device for intercommunicating address book information between different networks according to an embodiment of the present invention.

A device according to another embodiment includes a forwarding control unit 131, format conversion units 132, a sending unit 133, and an access control unit 134. As shown in FIG. 13, the forwarding control unit 131, the format conversion units 132, the sending unit 133, and the access control unit 134 are similar to the forwarding control unit 121, the format conversion units 122, the sending unit 123, and the access control unit 124 as shown in FIG. 11, and the difference is that the forwarding control unit 131, the format conversion units 132, the sending unit 133, and the access control unit 134 are integrated into one function unit. After the access control unit 134 determines account information of a user in a CAB network address book system, the sending unit 133 sends information to instruct the CAB network address book system to perform identity authentication on a corresponding account, acquires, from the forwarding control unit 131, relevant authentication data of the corresponding account sent from the CAB network address book system, authenticates the user, sends the converted address book information to the CAB network address book system if the authentication is successful, or otherwise, sends information for indicating that the authentication fails. In addition, the access control unit 134 may further have the interworking function, and therefore, after determining the account information of the user in the CAB network address book system, the access control unit 134 can directly instruct the CAB network address book system to perform identity authentication on the corresponding account information, and directly acquire the relevant authentication data of the corresponding account sent from the CAB network address book system. If the authentication is successful, the sending unit 133 sends the converted address book information to the CAB network address book system; or otherwise, sends the information for indicating that the authentication fails to the CAB network address book system.

It should be noted that the device according to the foregoing embodiment may be disposed at a network side, and an NE including the device, and a communication system formed of the device, a CAB network address book system, and a conventional network address book system fall within the protection scope of the present invention. In addition, the device according to the foregoing embodiment may also be disposed at a client (a User Equipment (UE)), and likewise, a UE including the device falls within the protection scope of the present invention.

Persons skilled in the art can understand that, any one of many different techniques and technologies can be used to denote information, a message, and a signal. For example, the message and the information which are mentioned in the illustration can be denoted by voltages, currents, electromagnetic waves, magnetic fields or particles, optical fields, or any combination thereof.

Further, persons skilled in the art should be capable of realizing that, the various illustrative units and algorithm steps described in connection with the embodiments disclosed herein are capable of being implemented as electronic hardware, computer software, or a combination of both. To clearly illustrate interchangeability of hardware and software, various illustrative components and steps have been described above generally in terms of their functions. Whether these functions are executed as hardware or software depends upon the particular application and design constraint conditions of the technical solution. Persons skilled in the art can implement the described functions in varying ways for each particular application, but such implementation should not be interpreted as departure from the scope of the present invention.

Persons having ordinary skill in the art may understand that all or part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be a magnetic disk, an optical disk, a Read-Only Memory (ROM), or a Random Access Memory (RAM). The foregoing descriptions of the disclosed embodiments enable persons skilled in the art to implement or use the present invention. Various modifications to the embodiments are apparent to persons skilled in the art, and a general principle as defined herein can be implemented in other embodiments without departing from the spirit or scope of the present invention. Therefore, the present invention is not limited to the embodiments disclosed herein, but has the widest scope conforming to the principles and novel features disclosed herein.

What is claimed is:

1. A method for intercommunicating address book information between different address book systems, comprising:
   receiving an interworking request carrying address book information, wherein the interworking request comes from a network address book system other than a Converged Address Book (CAB) system;
   converting the address book information according to an address book format supported by a server of the CAB system, wherein a format of the address book information carried in the interworking request is a vCard format or an hCard format, the converting step further comprises: reading information of key fields in the vCard or the hCard; writing the information of the key fields into corresponding fields of a CAB in a predetermined format; and generating a beginning row and an end row according to format requirements of Personal Communication Information (PCI), so as to obtain complete address book information in the predetermined format; and
   sending the converted address book information to the CAB system.

2. The method according to claim 1, wherein the interworking request further carries account information of a user; and
   the sending the converted address book information to the CAB system comprises:
   determining account information of the user in the CAB system according to the account information of the user carried in the interworking request and a predetermined corresponding relation between the account information of the user in different network systems; and
   sending the account information of the user in the CAB system and the converted address book information to the CAB system together.

3. The method according to claim 2, further comprising:
   before the sending the converted address book information to the CAB system, authenticating the account information of the user in the CAB system, and implementing the sending of the converted address book information to the CAB system if the authentication is successful.

4. A method for intercommunicating address book information between different address book systems, comprising:
   receiving an interworking request from a Converged Address Book (CAB) system, wherein the interworking request carries address book information and an identifier of a target network address book system;
   converting the address book information according to an address book format supported by the target network address book system, wherein the address book format supported by the target network address book system is a vCard format or an hCard format, the converting step further comprises: reading information of key fields in the address book information of the CAB network address book system; writing the information of the key fields into corresponding fields of the vCard or the hCard; and generating a beginning row and an end row according to specifications of the vCard or the hCard, so as to obtain complete address book information in the vCard or hCard format; and
   sending the converted address book information to the target network address book system.

5. The method according to claim 4, wherein the interworking request further carries account information of a user; and
   the sending the converted address book information to the target network address book system comprises:
   determining account information of the user in the target network address book system according to the account information of the user carried in the interworking request and a predetermined corresponding relation between the account information of the user in different network systems; and
   sending the account information of the user in the target network address book system and the converted address book information to the target network address book system together.

6. The method according to claim 5, further comprising:
   before the sending the converted address book information to the target network address book system, authenticating the account information of the user in the target network address book system, and implementing the sending of the converted address book information to the target network address book system if the authentication is successful.

7. A device for intercommunicating address book information between different address book systems, comprising: a first forwarding control unit, a first format conversion unit, and a first sending unit,
   wherein:
   the first forwarding control unit is configured to receive an interworking request from a Converged Address Book (CAB) system, wherein the interworking request carries address book information and an identifier of a target network address book system; and provide the address book information and the identifier of the target network address book system to the first format conversion unit;
   the first format conversion unit is configured to determine an address book format according to the identifier of the target network address book system, and convert the address book information into the corresponding address book format, wherein the address book format supported by the target network address book system is a vCard format or an hCard format, the first format conversion unit is specifically configured to read information of key fields in the address book information of the CAB network address book system; write the information of the key fields into corresponding fields of the vCard or the hCard; and generate a beginning row and an end row according to specifications of the vCard or the hCard, so as to obtain complete address book information in the vCard or hCard format; and the first sending unit is configured to send the converted address book information to the target network address book system.

8. The device according to claim 7, wherein the interworking request further carries account information of a user, and the converted address book information further comprises account information of the user in the target network address book system;

the device further comprises:
a first access control unit, configured to authenticate the account information of the user in the target network address book system, and provide an authentication result to the first sending unit; and
the first sending unit, configured to send the converted address book information after receiving the authentication result of successful authentication.

9. A device for intercommunicating address book information between different address book systems, comprising: a forwarding control unit, a sending unit, and multiple format conversion units, wherein:
the forwarding control unit is configured to receive an interworking request from a Converged Address Book (CAB) system, wherein the interworking request carries address book information and an identifier of a target network address book system; and provide the address book information to a corresponding format conversion unit according to a predetermined corresponding relation between a network address book system and the format conversion units;
the format conversion unit is configured to convert the address book information into address book information in an address book format supported by the target network address book system, wherein the address book format supported by the target network address book system is a vCard format or an hCard format, the first format conversion unit is specifically configured to read information of key fields in the address book information of the CAB network address book system; write the information of the key fields into corresponding fields of the vCard or the hCard; and generate a beginning row and an end row according to specifications of the vCard or the hCard, so as to obtain complete address book information in the vCard or hCard format; and
the sending unit is configured to send the converted address book information to the target network address book system.

10. A device for intercommunicating address book information between different networks, comprising: a forwarding control unit, a format conversion unit, and a sending unit, wherein:
the forwarding control unit is configured to receive an interworking request carrying address book information, wherein the interworking request comes from a network address book system other than a Converged Address Book (CAB) system;
the format conversion unit is configured to convert the address book information according to an address book format supported by the CAB system, wherein a format of the address book information carried in the interworking request is a vCard format or an hCard format, the format conversion unit is specifically configured to read information of key fields in the vCard or the hCard; write the information of the key fields into corresponding fields of a CAB in a predetermined format; and generate a beginning row and an end row according to format requirements of Personal Communication Information (PCI), so as to obtain complete address book information in the predetermined format; and
the sending unit is configured to send the converted address book information to the CAB network address book system.

11. The device according to claim 10, wherein the interworking request further carries account information of a user, and the converted address book information comprises account information of the user in the CAB network address book system;

the device further comprises:
an access control unit, configured to authenticate the account information of the user in the CAB network address book system, and provide an authentication result to the third sending unit; and
the sending unit, configured to send the converted address book information after receiving the authentication result of successful authentication.

* * * * *